United States Patent

[11] 3,539,106

[72] Inventor Vincent L. Ramik
4966 Sabra Lane, Annandale, Virginia 22003
[21] Appl. No. 713,339
[22] Filed March 15, 1968
[45] Patented Nov. 10, 1970

[54] COMBINED HOSE AND SPRINKLER
9 Claims, 8 Drawing Figs.
[52] U.S. Cl. ............................................. 239/145,
239/267, 239/447, 239/450, 239/562, 239/567;
239/569, 239/566
[51] Int. Cl. ..................................................... A01g 27/00
[50] Field of Search .......................................... 239/450,
447, 266, 267, 145, 562—569; 138/115, 116, 117

[56] References Cited
UNITED STATES PATENTS
| | | | |
|---|---|---|---|
| 2,743,960 | 5/1956 | Kamin | 239/266 |
| 2,753,215 | 7/1956 | Barr | 239/447 |
| 2,757,965 | 8/1956 | Andrews | 239/268 |

Primary Examiner—Lloyd L. King

ABSTRACT: This invention is directed to what is commonly termed a "garden hose" which is constructed to provide the advantages of both "soaker-type" or "sprinkler-type" garden hoses and conventional "single-stream" hoses in a single multipurpose garden hose. The hose includes at least a pair of generally coextensive conduits with means at one end for coupling the hose to a conventional water spigot and means at an opposite end for selectively directing the water in either a single stream outwardly of any type of conventional nozzle or directing the water through a plurality of sprinkle apertures in a wall of one of the conduits. The hose is preferably constructed from extruded polymeric or copolymeric plastic material, such as polyethylene, which is extruded in a novel manner which includes "bumping" closed one of the conduits to close an end thereof such that water is first directed through an open-ended conduit and then reversely directed toward the closed end of the other conduit thus avoiding the necessity for separate closing means and permitting the manufacture of the hose at a cost markedly less than the cost involved in manufacturing an individual uni-flow garden hose and a multiflow sprinkler hose.

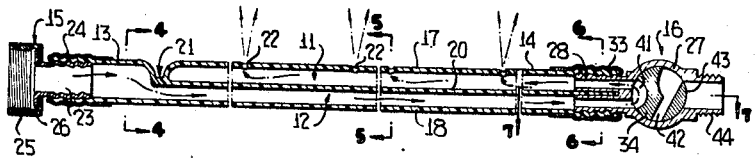

Patented Nov. 10, 1970

3,539,106

INVENTOR
VINCENT L. RAMIK

*Vincent L. Ramik*

ATTORNEY

COMBINED HOSE AND SPRINKLER

At present garden hose are manufactured to perform one of two distinct functions, namely, to apply water to a lawn or similar area in a sprinkler fashion through a plurality of apertures or to directly apply water in a uniflow manner through a conventional nozzle. The green-thumbed suburbanite therefore includes in his category of paraphernalia one hose for accomplishing one purpose and another hose for accomplishing another. Assuming, for example, that it is desired to wash an automobile, wet down a patio, flush drain spouts, etc. the customary practice is to connect the usual unapertured hose to a spigot and perform these tasks in the usual manner. Assuming again that the initial objective is that of Sprinkling or wetting down shrubbery, grass, trees, or other vegetation the usual unapertured hose is discarded and an apertured soaker-type hose or the equivalent "lawn sprinkler" is employed. However, more often than not the objectives are not those which can be successfully performed by one type or the other type hose but by preferably a combination of both. In the assumed situation it might be desirable after washing one's car to immediately and with no effort whatever sprinkle a lawn for an extended time duration. At present this can only be done by first removing the conventional unapertured hose from the spigot and connecting an apertured sprinkler hose thereto or disconnecting the nozzle from the unapertured hose and connecting one of numerous types of lawn sprinklers thereto which, of course, in each case requires the termination of the water flow at its source i.e. the spigot. It is therefore extremely desirable to provide a hose which can provide all of the functions heretofore noted and others not only from the standpoint of efficiency of operation but also when viewed from the standpoint of the cost involved in purchasing, storing and using two hoses when one is sufficient.

It is a known fact that each nonapertured hose requires one female coupling at one end and one male coupling at an opposite end. It is also true that each soaker-type hose requires one female coupling at one end and one male coupling at another end. A composite hose constructed in accordance with this invention which can perform both functions yet which only requires one female coupling and one male coupling therefore automatically eliminates the costs involved in (1) manufacturing two additional and unnecessary couplings, (2) securing each of the couplings to individual hoses, (3) manufacturing two individual hoses, and (4) individually packaging, storing, shipping, and distributing two hoses instead of one.

It is therefore a primary object of this invention to provide a "garden" hose which can be employed to direct a single stream of water or a plurality of streams of water as may be desired with no effort other than that of manipulating a valve at the discharge end of the hose, thus not only eliminating the costs involved in manufacturing and purchasing two separate hoses for performing separate functions, but also achieving the intended functions at a fraction of the cost above that necessary for manufacturing (or purchasing) either of the individual hoses heretofore described.

A further object of this invention is to provide a novel multipurpose hose of the type heretofore described streams. wherein the same is preferably constructed from extruded plastic material to form two or more generally coterminus conduits, at least one of said conduits being "bumped" closed during the manufacture thereof, and means opposite the bumped portion of the one conduit for directing fluid completely through another of the conduits or redirecting fluid toward the bump portion of the first conduit with the latter being apertured along the length thereof to selectively direct the fluid in either single or multiple streams.

Still another object of this invention is to provide a novel hose of the type described wherein but a single female coupling and a single male coupling are required to effect the functioning of the hose in the manner intended in conjunction with a selectively operable valve which is preferably though not necessarily positioned at the discharge end of the hose.

A further object of this invention is to provide a novel method of manufacturing a hose of the type described in an extremely simple manner and at a low cost as compared to the manufacturer of individual unapertured uniflow hoses and apertured multiflow hoses of known constructions.

With the above and other objects in view that will hereinafter appear, the nature of the invention will be more clearly understood by reference to the following detailed description, the appended claimed subject matter, and the several views illustrated in the accompanying drawing.

IN THE DRAWING

FIG. 1 is a perspective view of a novel hose constructed in accordance with this invention, and illustrates the same connected to a conventional spigot with a valve thereof positioned to direct water outwardly of an apertured conduit of the hose for sprinkling or soaking purposes.

FIG. 2 is an enlarged fragmentary sectional view taken along the length of the hose of FIG. 1, and illustrates generally coterminus conduit or passage means having a common wall, an apertured one of the passage means being closed, and a selectively operable valve at an end opposite the closed passage means positioned to condition the hose for sprinkling operations.

FIG. 3 is a fragmentary sectional view of the right-handmost end of the hose of FIG. 2, and illustrates the valve thereof positioned to direct a stream of liquid directly outwardly of an unapertured conduit or passage means of the hose.

FIG. 4 is a cross-sectional view taken generally along line 4—4 of FIG. 2, and more clearly discloses the manner in which the apertured passage means is closed by a "bumped" portion of the wall thereof.

FIG. 5 is a sectional view taken generally along line 5—5 of FIG. 2, and illustrates a common wall joining the apertured and unapertured passage means of the hose.

FIG. 6 is a sectional view taken generally along line 6—6 of FIG. 2, and illustrates the manner in which a male coupling is attached to a discharge end of the hose.

FIG. 7 is a fragmentary sectional view taken generally along line 7—7 of FIG. 2, and more clearly discloses the construction of the valve for selectively directing the fluid through the apertured passage means, outwardly of the male coupling means, or completely closing the flow of fluid through the apertured passage means or outwardly of the male coupling.

FIG. 8 is a schematic view of a novel method of constructing the hose of this invention.

A novel apparatus for selectively directing a fluid medium, such as water, in either a single or multiple streams is fully illustrated in the drawing and is generally designated by the reference numeral 10. The apparatus 10 is a conduit means or hose defined by a pair of passage means, generally designated by the reference numerals 11, 12. The hose 10 and the passage means or passages 11, 12 thereof are formed from a single piece of extruded polymeric or copolymeric plastic material, such as polyethylene. The hose or conduit means 10 includes opposite end portions 13, 14. The end portion 13 is provided with means 15 in the form of a female coupling for connecting the conduit or hose 10 to a source of fluid medium as, for example, a spigot S (FIG. 1). Second means 16 in the form of a male coupling and valve assembly is connected to the end portion 14 of the conduit 10 for directing the liquid either outwardly of the passage 12 in a single stream through a conventional nozzle N (FIG. 1), into and along the passage 11, or completely preventing the flow of liquid outwardly of the passage 12.

The hose or conduit 10 and the passages 11, 12 thereof are defined by a pair of walls 17, 18 and a common wall 20 which are an integral, homogeneous mass of the plastic material from which the hose 10 is constructed in a manner to be described hereafter. Means 21 is a "bumped" portion of the material of the wall 17 which is united with the wall 20 to close the passage 11 adjacent the end portion 13, in a manner which will be described hereafter. The wall 17 is also provided with a plurality of passages 22 spaced along the length thereof from the closed portion 21 toward the end portion 14 through which liquid may flow in a plurality of sprinkling-type streams in the manner illustrated in FIG. 1. As is best illustrated in FIG. 2 of the drawings, it is to be particularly noted that the liquid (water) is emitted through the apertures 22 during the reversed flow thereof from right-to-left as compared to the flow of the liquid through the passage 12 from left-to-right, as indicated by the headed arrows in this FIG.

Reference is now made to the female coupling 15 which is of a completely conventional construction and is defined by a tubular portion 23 inserted into the interior of the hose end portion 13 which to the left of the bumped or closed portion 21 is devoid of the common wall 20. The tubular end portion 23 is therefore inserted into the interior of the tubular end portion 13 in a conventional manner and clamped thereto by a securing collar 24. An internally threaded female collar 25 is freely rotatably secured to a flange 26 of the tubular portion 23 in a conventional manner to effect the coupling and uncoupling of the hose 10 to the spigot S by simply rotating the collar 25 in a known manner.

The male coupling and valve mechanism 16 at the end portion 14 of the hose 10 is of a somewhat unconventional construction and includes a housing 27 provided with a pair of tubular portions 28, 30 (FIG. 6) which are generally half-moon shaped in transverse section with respective walls 31, 32 thereof being in parallel relationship. The tubular portions 28, 30 are inserted into the passages 11, 12, respectively, with the common wall 20 being disposed between the walls 31, 32 in the manner clearly illustrated in FIGS. 2, 3 and 6 of the drawings. A crimped clamping collar 33 which is similar to the conventional collar 24 maintains the end portion 14 of the hose 10 securely clamped to the tubular portions 28, 30.

The mechanisms 16 further includes a valve 34 mounted for rotation by manipulating a handle 35 between any of three selected positions. The valve 34 is rotatably mounted in a generally cylindrical chamber 36 and is retained therein by a threaded element 37. Conventional seals 38, 40 are disposed at axially opposite end portions of the valve 34 to prevent leakage.

The valve 34 includes a first passage 41 of a generally semicircular configuration opening through the periphery of the valve body, a second passage 42 and an arcuate sealing surface 43.

With the valve 34 positioned in the manner illustrated in FIG. 2 of the drawing, liquid from the spigot S flows through the passage 12 into the tubular portion 30, into and through the passage or port 41, into and through the tubular portion 28 and into the passage 11 for multistream dispersion outwardly thereof through the passages 22, noting that the bumped portion or closure wall 21 prevents the liquid in the passage 11 from being directed otherwise than outwardly through the passages 22.

When it is desired to direct liquid directly out of these hose 10 through a conventional male end portion 44 to which the nozzle N is coupled the handle 35 is rotated to place the passage or port 42 into communication with the passage 12 as shown in FIG. 3. In this position the liquid is directed from the spigot S. through the coupling 15, the passage 12, the tubular portion 30, the passage 42, the male coupling portion 44 and the nozzle N directly outwardly of the hose 10 in a single stream. noting that in this same position fluid communication is is completely cutoff to the passage 11, as clearly illustrated in FIG. 3.

If it is desirable to cutoff both flows of the liquid through the apertures 22 or directly through the male portion 44 the valve 34 is rotated to position the arcuate sealing surface 43 directly into overlying closing relationship to each of the tubular portions 28, 30, as can be readily apparent by visualizing the rotation of the valve 34 from the position shown in FIG. 2 to a clockwise position approximately 90° disposed therefrom thus bringing the surface 43 into complete closed overlying relationship to the latter-noted passages.

From the foregoing description of the hose 10 it should be particularly noted that at the end portion 13 there is but a single female coupling member 15 and at the opposite end portion there is but a single male coupling element 16. Furthermore, as will be apparent more fully hereafter the walls 17, 18 and 20 defining the conduit or hose proper are of a one-piece single, integral, homogeneous construction.

The novel method of manufacturing the hose 10 of this invention is diagrammatically illustrated in FIG. 8 of the drawings, and attention is particularly directed thereto. The hose 10, as was heretofore noted, is extruded by means of a conventional extruder (not shown) through a pair of orifices defined by a female shell 50 and a pair of mandrels or cores 51, 52 the latter of which is longer than the former, as is illustrated in FIG. 5. The opposed faces (unnumbered) of the cores 51, 52 are generally flat and in parallel relationship to each other while the opposite faces thereof are generally semicylindrical thus resulting in the extrusion of the hose 10 to the configuration best illustrated in FIG. 5. As a portion of the hose 10 passes beyond the core 51 though not beyond the core 52 a bumper member 53 is moved toward and into contact with the wall 17 thus urging the same into contact with the common wall 20. Since the plastic material being extruded is at this time hot and adherent the walls 17, 20 are intermingled, merged and united to form the bumped portion 21 heretofore noted relative to FIG. 2, thus resulting in the closure of the passage 11.

The extruded hose 10 moves from left-to-right in FIG. 8 until the bumped portion 21 passes beyond a pair of shears 54, 55 which sever the hose to the left of the bumped portion as is readily apparent in this FIG. This severing operation thus automatically forms the end portion 13 of a leading hose and the end portion 14 of a trailing hose in a single operation.

Finally, the portion of the common wall 20 to the left of the bumped portion is removed by a rotating cutter to complete the manufacture of the hose 10, except, of course, for the conventional formation of the apertures 27 and the application of the female coupling 15 and the male coupling 16 in the manner heretofore described.

It should be particularly noted that the hose 10 is therefore manufactured by simply extruding a single multipassage extrudate, "bumping" one of the passages thereof closed, and severing the extruded hose or extrudate as described with or without the trimming operation. As to the trimming operation, it should be noted that the removal of the portion of the common wall 20 to the left of the bumped portion 21 in FIG. 8 is not necessary and if unremoved the tubular portion 23 of the female coupling 15 could be constructed in the form of a pair of portions similar to the portions 28, 30 of the coupling 16. When so constructed fluid entering one of the tubular portions would flow directly through the passage 12 in an unobstructed manner while fluid entering the other of the portions would be prevented from flowing beyond the bumped portion 21. Thus, the trimming operation is not necessarily required and could be eliminated as found necessary or desirable.

While a specific form of the apparatus 10 and the desired method of manufacturing thereof has been heretofore described, obvious departures thereof are considered to be within the scope of this invention. For example, while the hose 10 includes only two passages 11, 12 the same may be formed to include three, four or more passages with all but one of the passages being provided with apertures corresponding to the apertures 22. For example, by providing the extruder (not shown) FIG. 8 with another core corresponding to the core 51 but positioned beneath the core 52 as illustrated in FIG. 8 a 3-passage hose can be manufactured and the additionally provided passage could be closed by bumping the same with a member corresponding to the member 53 moving upwardly in alignment with the member 53 and against the core 52. This would, of course, require an appropriately modified male coupling and valve mechanism 16.

It is likewise possible to dispose another core corresponding to the core 51 directly thereabove as viewed in FIG. 8 to extrude a similar 3-passage conduit and close the uppermost two conduits by the bumper 53. Similarly, in this case the male coupling and valve mechanism 16 would be provided with an additional tubular portion corresponding to the portion 28 but disposed thereabove and inserted into the additional passageway with the port 41 of the valve 34 being modified to direct the liquid into both the passage 11 and the additional passage (not shown). The manner of forming the apertures 22 in the wall 17 is well known and in the last example such passages can be provided in both the wall 17 and the wall (not shown) of the additional passage in a simplified manner. It is to be also noted in this respect that even in the three or more passaged hose the trimming operation can be again eliminated by simply substituting multipassaged portions for the tubular portions 23 of the female coupling 15.

In further accordance with this invention the trimming operation need not be performed and in lieu of the tubular portion 23 the same may be provided with a portion inserted into the passage 12 and another portion which is blind or closed being disposed in alignment with the bumped portion 21 to prevent the force of the liquid from acting directly against the bumped portion 21. In the latter example the bumped portion 21 may be entirely eliminated. Likewise, the particular configuration or shape of the hose is immaterial insofar as the invention is concerned.

Though not shown, the threads of the female collar 25 are preferably complementary to the threads on the male end portion 44 to permit two or more of the hoses 10 to be coupled to each other. Assuming two hoses 10 were coupled to each other, uniflow watering would be effected by positioning the valve of the hose connected to the spigot 5 in the position shown in FIG. 3. The valve of the second hose would be likewise positioned and the water would therefore flow through the unapertured passages 12, 12 of both hoses.

In order to perform a "soaker" operation, the valve of the hose connected to the spigot 5 is rotated 180° from that shown in FIG. 3 while the valve of the second hose is positioned as shown in FIG. 2. Thus, water flowing through the passage 12 of the first hose will be partially reversed in direction by the enlarged portion of the valve passage 42 and directed to the passage 11 while the remaining portion of the water will pass through the narrow portion of the valve passage 42, enter the passage 12 of the second hose, and then be directed into the passage 11 of the second hose by the position of the valve passage 41 as shown in FIG. 2. Therefore, the 3-position valve is equally effective as a 4-position valve in either uniflow or soaker applications of two or more coupled hoses.

I claim:

1. Apparatus for selectively directing a fluid medium in either a single or multiple streams comprising conduit means defining at least a pair of passage means, means for distributing a fluid medium in a plurality of discrete streams outwardly of and at least partially along a first passage means, means for introducing a fluid medium into a second of said passage means for flow in a first direction, and means for selectively directing the fluid medium out of said second passage means and redirecting the fluid medium into and along said first passage means in a direction generally opposite to said first direction.

2. The apparatus as defined in claim 1 wherein said selectively directing means is a valve.

3. The apparatus as defined in claim 1 wherein said conduit means has opposite end portions, first means at one end portion for coupling said conduit means to a source of fluid medium, and said selective directing means being disposed at an opposite end portion of said conduit means.

4. The apparatus as defined in claim 1 wherein said introducing means is a coupling adapted to be secured to said conduit means, said coupling having a blind end closing said first passage means and an open end for introducing fluid media into said second passage means, and said directing means being operative for redirecting the fluid media toward said blind end.

5. The apparatus as defined in claim 1 wherein said introducing means is a coupling adapted to be secured to said conduit means, said coupling having a blind end closing said first passage means and an open end for introducing fluid media into said second passage means, said directing means being operative for redirecting the fluid media toward said blind end and said distributing means is a plurality of apertures located along said first passage means opening to atmosphere.

6. The apparatus as defined in claim 1 including means for closing said first passage means between said introducing means and said directing means.

7. The apparatus as defined in claim 6 wherein said directing means is effective for selectively directing a fluid medium outwardly of said second passage means and toward said closing means of said first passage means.

8. The apparatus as defined in claim 1 wherein said directing means is valve means for selectively directing a fluid medium outwardly of said second passage means, toward said closing means of said first passage means and further preventing the flow of the fluid medium outwardly of both said passage means.

9. The apparatus as defined in claim 6 wherein said closing means is a fused area of the material partially defining a wall portion of said first passage means and a wall portion common to and partially defining both passage means.